(12) United States Patent
Seferi

(10) Patent No.: US 11,117,275 B2
(45) Date of Patent: Sep. 14, 2021

(54) LOW FRICTION PIVOT ASSEMBLY FOR SCISSORS

(71) Applicant: Acme United Corporation, Fairfield, CT (US)

(72) Inventor: Nicholas L. Seferi, Southbury, CT (US)

(73) Assignee: Acme United Corporation, Fairfield, CT (US)

( * ) Notice: Subject to any disclaimer, the term of this patent is extended or adjusted under 35 U.S.C. 154(b) by 51 days.

(21) Appl. No.: 16/267,772

(22) Filed: Feb. 5, 2019

(65) Prior Publication Data

US 2019/0270209 A1  Sep. 5, 2019

Related U.S. Application Data

(63) Continuation-in-part of application No. 15/909,172, filed on Mar. 1, 2018, now abandoned.

(51) Int. Cl.
*B26B 13/28* (2006.01)
*B26B 13/20* (2006.01)
*F16B 39/32* (2006.01)
*F16B 39/24* (2006.01)

(52) U.S. Cl.
CPC .............. *B26B 13/28* (2013.01); *B26B 13/20* (2013.01); *F16B 39/24* (2013.01); *F16B 39/32* (2013.01)

(58) Field of Classification Search
CPC ....... B26B 13/28; B26B 13/285; B26B 13/20; F16B 39/24; F16B 39/32; F16B 39/108; F16B 39/101; F16B 39/103; F16B 39/282; F16B 19/1027; F16B 37/145; Y10S 411/951; Y10S 411/95; B23K 31/025; B25B 7/06–08

USPC ..... 81/416; 30/270, 254, 266; 411/221, 316, 411/191, 192, 926, 327, 329, 271, 114, 411/109, 961, 962, 953, 214–215, 138, 411/146, 211, 338, 330, 166

See application file for complete search history.

(56) References Cited

U.S. PATENT DOCUMENTS

| | | | | |
|---|---|---|---|---|
| 1,741,803 A | * | 12/1929 | Zeidler | B26B 13/28 30/266 |
| 1,778,346 A | * | 10/1930 | Zeidler | B26B 13/04 30/349 |
| 2,640,262 A | * | 6/1953 | Spon | A01G 3/02 30/270 |
| 2,704,399 A | * | 3/1955 | Melcher | A61B 17/3201 30/266 |
| 2,741,843 A | * | 4/1956 | Sejman | B26B 13/28 30/266 |
| 3,648,550 A | * | 3/1972 | Rozmus | B25B 7/18 81/416 |
| 3,833,953 A | * | 9/1974 | Fisher | B25B 7/08 7/133 |

(Continued)

*Primary Examiner* — Laura M Lee
(74) *Attorney, Agent, or Firm* — Alix, Yale & Ristas, LLP

(57) ABSTRACT

A low-friction hub assembly for pivotally connecting a pair of scissors or lever-like members employs a pair of cooperative hub members. A first hub member has an exterior threaded surface which threadably engages with an interior threaded surface of the second hub member. Each of the hub members has annular shoulders which engage against opposed annular surfaces of surrounding aligned pivot openings of the scissors. A locking member comprising a pair of opposed pawls engages a serrated surface to lock the subassembly. A throughbore extends through the pivot assembly.

19 Claims, 24 Drawing Sheets

(56) References Cited

U.S. PATENT DOCUMENTS

| | | | | |
|---|---|---|---|---|
| 4,617,118 | A * | 10/1986 | Smart | B01D 35/14 210/232 |
| 5,243,762 | A * | 9/1993 | Orthey | B26B 13/16 30/254 |
| 5,341,573 | A * | 8/1994 | Linden | B25B 7/06 30/254 |
| 5,673,955 | A * | 10/1997 | Neubauer | A47J 45/10 294/118 |
| 6,378,403 | B1 * | 4/2002 | Bates | B25B 7/06 29/229 |
| 6,408,523 | B1 * | 6/2002 | Schmidt | B26B 13/28 30/254 |
| 6,904,685 | B1 * | 6/2005 | Yeh | B26B 13/28 30/254 |
| 7,389,715 | B1 * | 6/2008 | Lin | B25B 7/08 81/416 |
| 7,451,673 | B1 * | 11/2008 | Petersen | B25B 7/08 81/305 |
| 7,454,838 | B2 | 11/2008 | Gianola | |
| 7,640,667 | B2 * | 1/2010 | Pollock | A01G 3/02 30/267 |
| 8,276,278 | B2 * | 10/2012 | Makoto | B26B 13/08 30/194 |
| D717,623 | S | 11/2014 | Savolainen et al. | |
| 10,927,880 | B2 * | 2/2021 | Hess | F16B 39/24 |
| 2005/0044724 | A1 * | 3/2005 | Lin | B26B 13/28 30/266 |
| 2019/0257350 | A1 * | 8/2019 | Hess | F16B 39/24 |
| 2019/0270208 | A1 * | 9/2019 | Seferi | B26B 13/28 |
| 2019/0270209 | A1 * | 9/2019 | Seferi | B26B 13/20 |

* cited by examiner

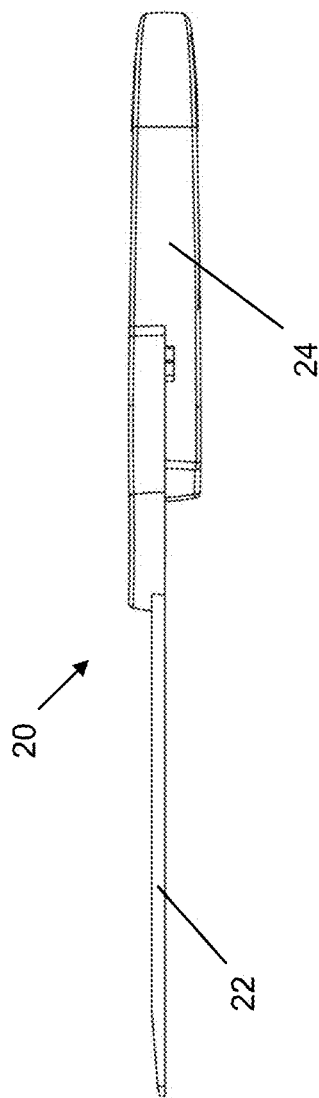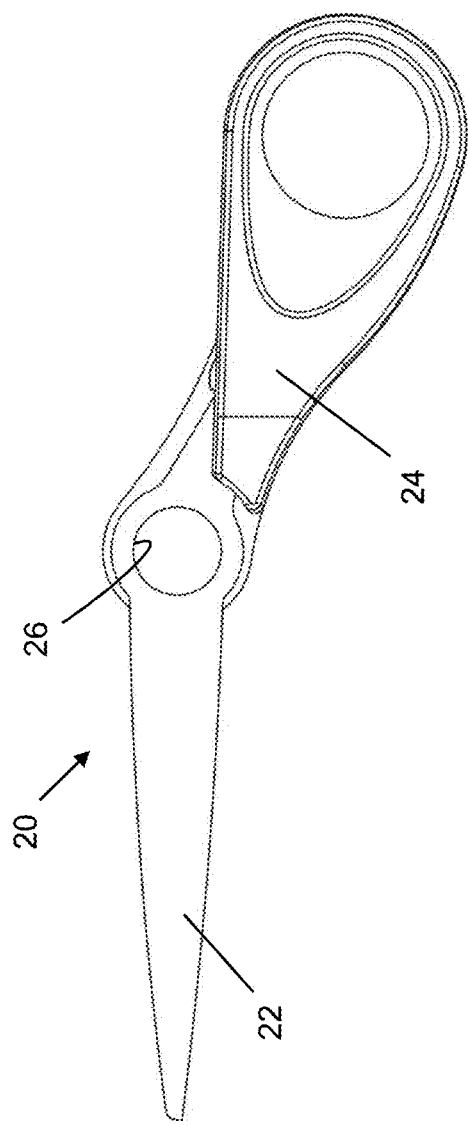

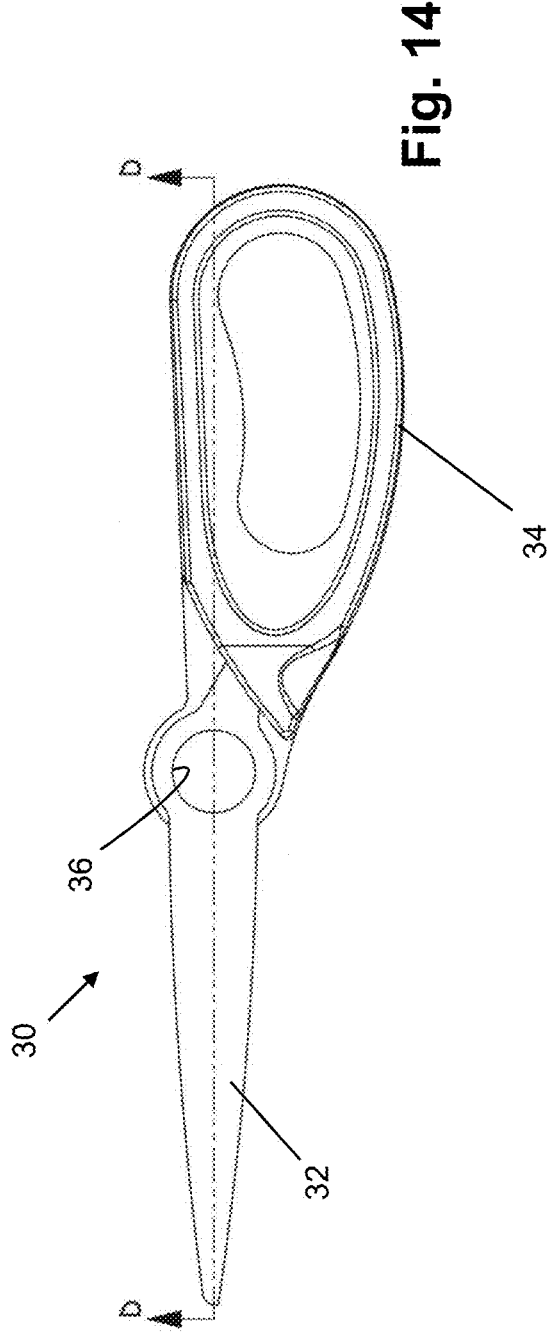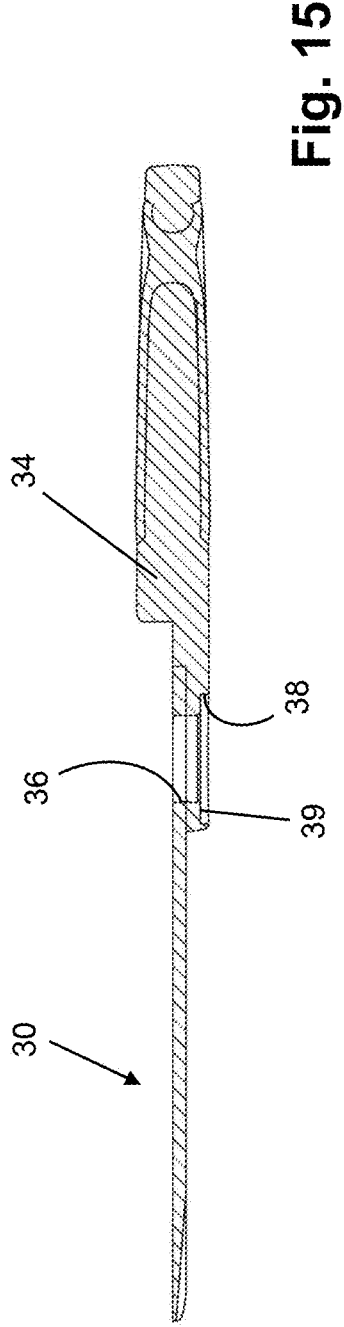

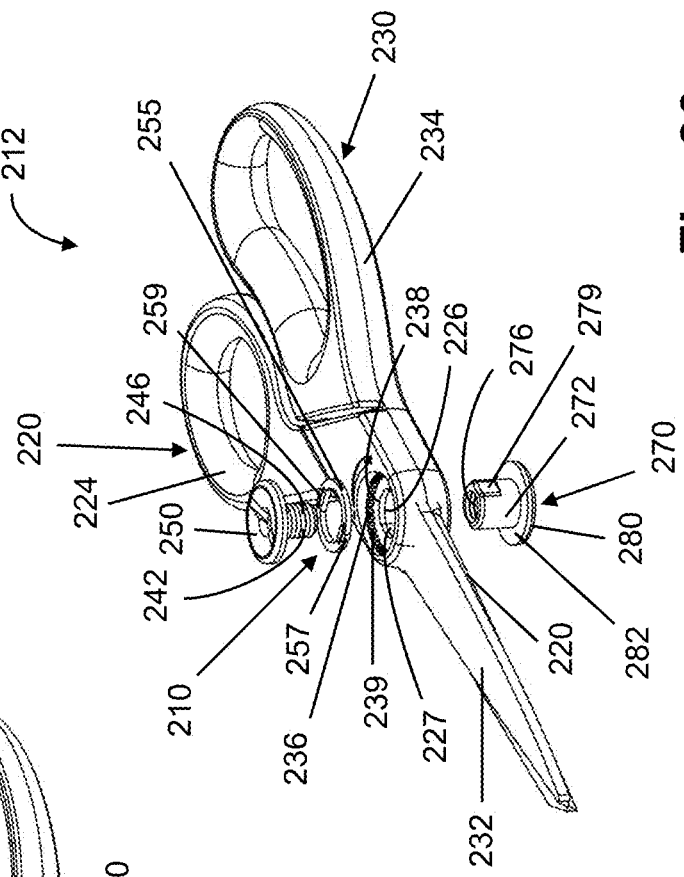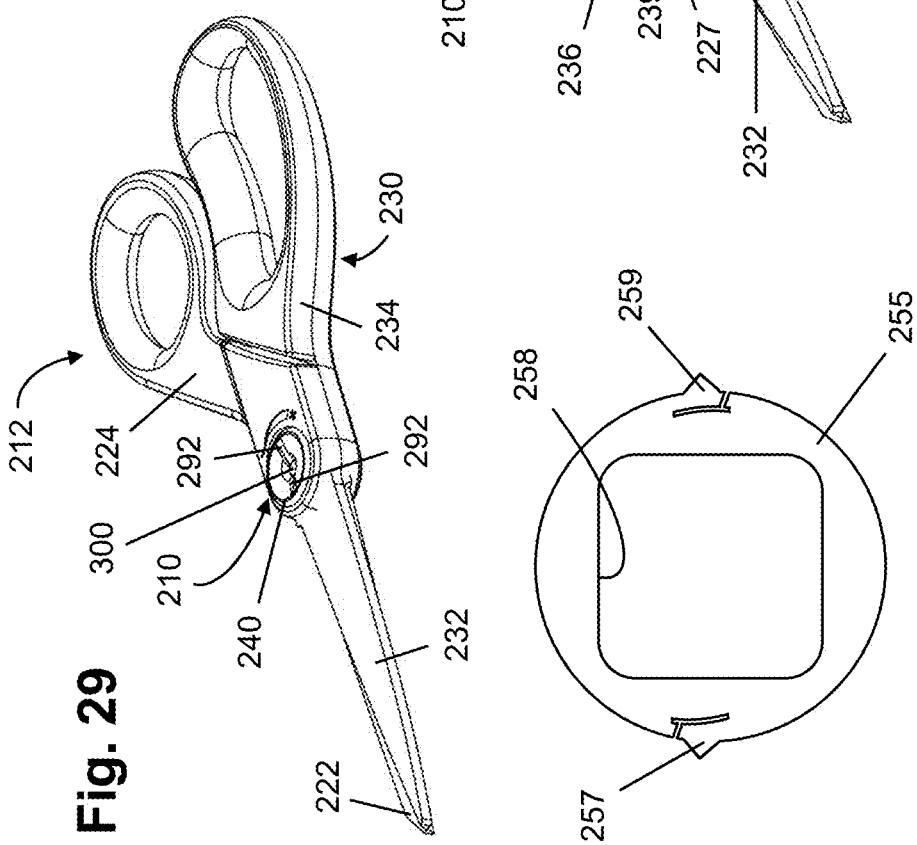
Fig. 29
Fig. 30
Fig. 30A

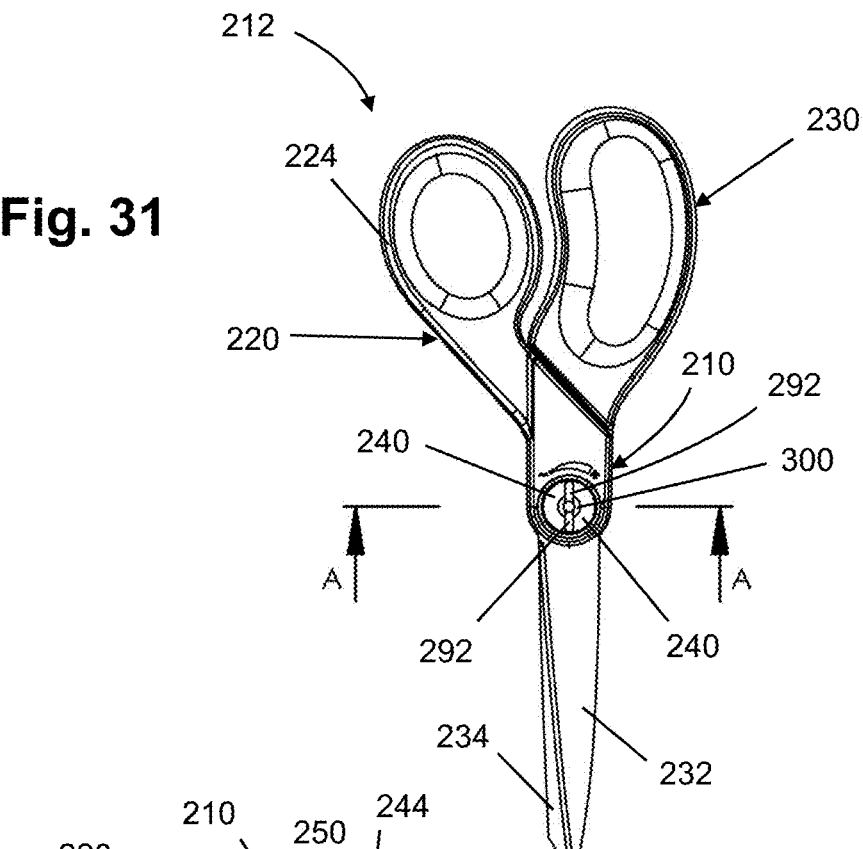
Fig. 31
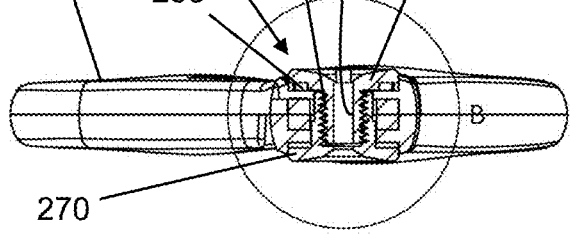
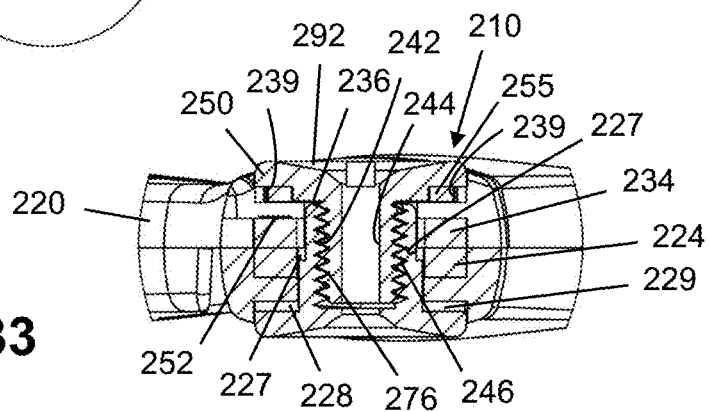
Fig. 32
Fig. 33

LOW FRICTION PIVOT ASSEMBLY FOR SCISSORS

CROSS-REFERENCE TO RELATED APPLICATION

This application is a continuation-in-part of U.S. patent application Ser. No. 15/909,172 filed on Mar. 1, 2018.

BACKGROUND

This disclosure relates generally to a pair of lever-like scissors which are pivotally joined to provide a cutting tool. More particularly, this disclosure relates to techniques and assemblies for implementing a pivotal connection between scissors.

Scissor technology is well developed and numerous proposals have been advanced for implementing a pivot assembly for lever-like scissor assemblies which have numerous configurations. It has long been a desirable objective to provide a pivot assembly which provides a low friction operation, is formed from relatively inexpensive components and is efficiently assembled during the scissor manufacturing process.

SUMMARY

Briefly stated, a low friction hub for pivotally connecting a pair of scissors comprises a first hub member and a second hub member. The first hub member comprises a sleeve defining a cylindrical bore and having an exterior threaded surface. A head integrally extends at a top of the sleeve and defines an annular shoulder projecting radially from the sleeve and having a tapered upper surface terminating in a peripheral rim and having an inwardly angled surface adjacent the bore and interrupted by a pair of opposed slots. A lock member receives the sleeve and has a pair of pawls. The second hub member comprises a sleeve having a cylindrical exterior surface and defining an interior threaded bore. A head integrally extends at a bottom of the sleeve and defines an annular shoulder projecting radially from the sleeve. The second member head has a tapered lower surface terminating in a peripheral rim and an inwardly angled surface adjacent the threaded bore and interrupted by a pair of opposed slots. The second hub member threadably receives the first hub member so that the pawls engage a serrated surface surrounding an opening in the thumb assembly, and a central throughbore traverses through the first and second hub members.

The pawls each have a V-shaped section. An annular recess is preferably disposed between the serrated surface and the exterior threaded surface of the first hub member. The first hub member head and the second hub member head are substantially identical. Multiple angularly spaced dimples are preferably defined in the first hub member head and the second hub member head.

A low friction hub for pivotally connecting a pair of scissors comprises a first hub member and a second hub member. The first hub member comprises a sleeve defining a cylindrical bore. The sleeve has an exterior threaded surface and a circumferential serrated surface. A head integrally extends at a top of the sleeve and defines a shoulder projecting radially from the sleeve. The head has an upper surface terminating in a peripheral rim and extending to the cylindrical bore. The second hub member comprises a sleeve having a cylindrical exterior surface and defining an interior threaded bore and at least one axially projecting pawl. A second member head integrally extends at a bottom of the sleeve and defines a shoulder projecting radially from the sleeve. The second member head has a lower surface terminating in a peripheral rim and extending to the threaded bore. A locking member has diametrically opposed pawls and receives a hub member. The hub member threadably receives the first hub member so that at least one pawl engages the serrated surface and surrounds an opening through a blade assembly, and a central throughbore traverses through the first and second hub members.

There are preferably two opposed pawls each having a V-shaped section. The first hub member head and the second hub member head are substantially identical. Each head defines a pair of opposed slots. The upper and lower surface of the first and second heads each respectively extends inwardly toward the throughbore.

A pair of scissors comprises a lever-like thumb subassembly which defines a first circular opening having a first diameter and a first serrated surface surrounding the opening. A lever-like finger assembly defines a second circular opening having a diameter equal to the first diameter and a second annular surface surrounding the opening.

A first hub member comprises a sleeve defining a cylindrical bore and having an exterior threaded surface and a circumferential serrated surface. A head integrally extends at a top of the sleeve and defines an annular shoulder projecting radially from the sleeve. The head has an upper surface terminating at a peripheral rim and has an inwardly angled surface adjacent the bore that is interrupted by a pair of opposed slots.

A second hub member comprises a sleeve having an exterior cylindrical surface having a diameter substantially equal to the first opening diameter. The second hub member sleeve defines an interior threaded bore. A second member head integrally extends at a bottom of the sleeve. The second member head has a lower surface terminating at a peripheral rim and has an inwardly angled surface adjacent the bore that is interrupted by a pair of opposed slots.

A lock member comprising a plurality of projecting pawls and a central opening receives the first hub member. The pawls preferably have a V-shaped section. The head of the first hub member and the head of the second hub member are substantially identical. Slots are oriented obliquely relative to at least one member head.

BRIEF DESCRIPTION OF THE DRAWINGS

FIG. 12 is a side view of the thumb loop subassembly of FIG. 11;

FIG. 13 is a bottom plan view of the thumb loop subassembly of FIG. 10;

FIG. 14 is a top plan view of the finger loop subassembly for the scissors of FIG. 1;

FIG. 15 is a sectional view of the finger loop subassembly taken along the line D-D of FIG. 14;

FIG. 29 is a perspective view of a pair of scissors which employ a third embodiment of a low friction pivot assembly;

FIG. 30 is an exploded generally top perspective view of the scissors of FIG. 29;

FIG. 30A is an enlarged view of a lock member illustrated in FIG. 30;

FIG. 31 is a top view of the pair of scissors of FIG. 29;

FIG. 32 is a sectional view of the scissors of FIG. 31 taken along the line A-A thereof; and FIG. 33 is an enlarged view of the circled portion of FIG. 32.

DETAILED DESCRIPTION

Figure 1:
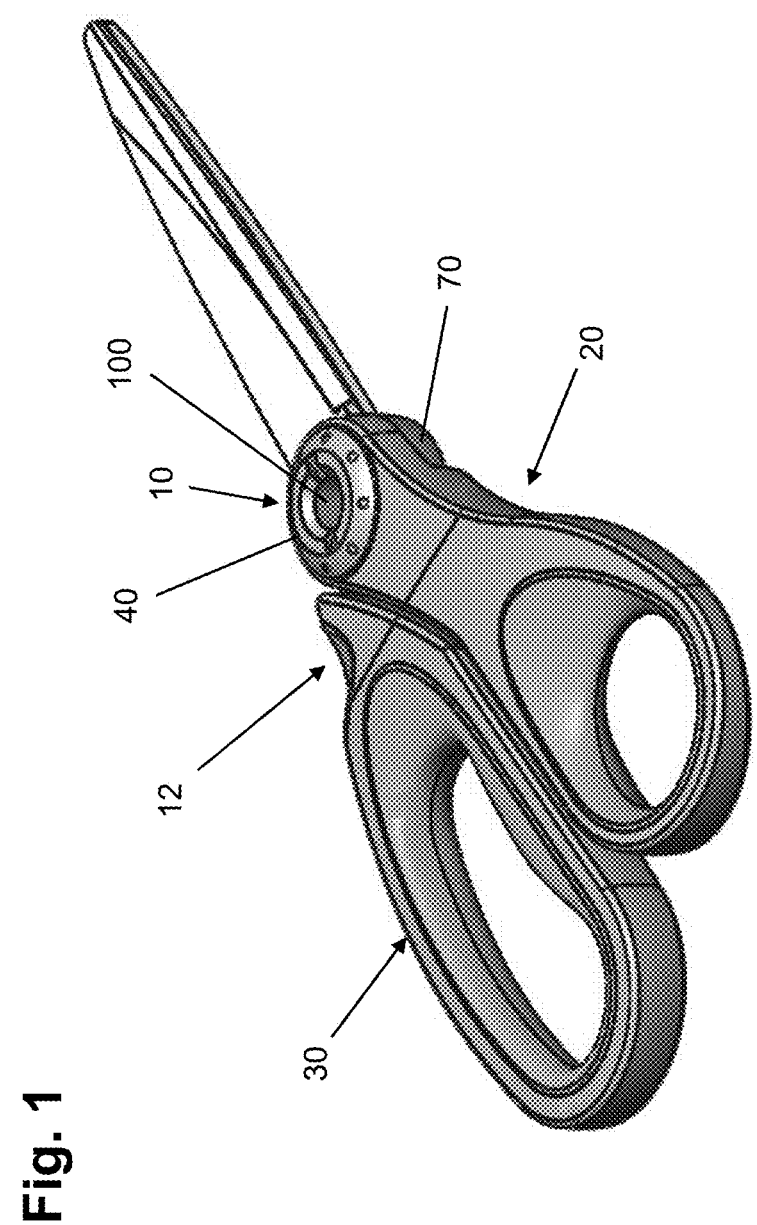
FIG. 1 is a perspective view of a pair of scissors which employs a low friction pivot assembly.
Figure 2:
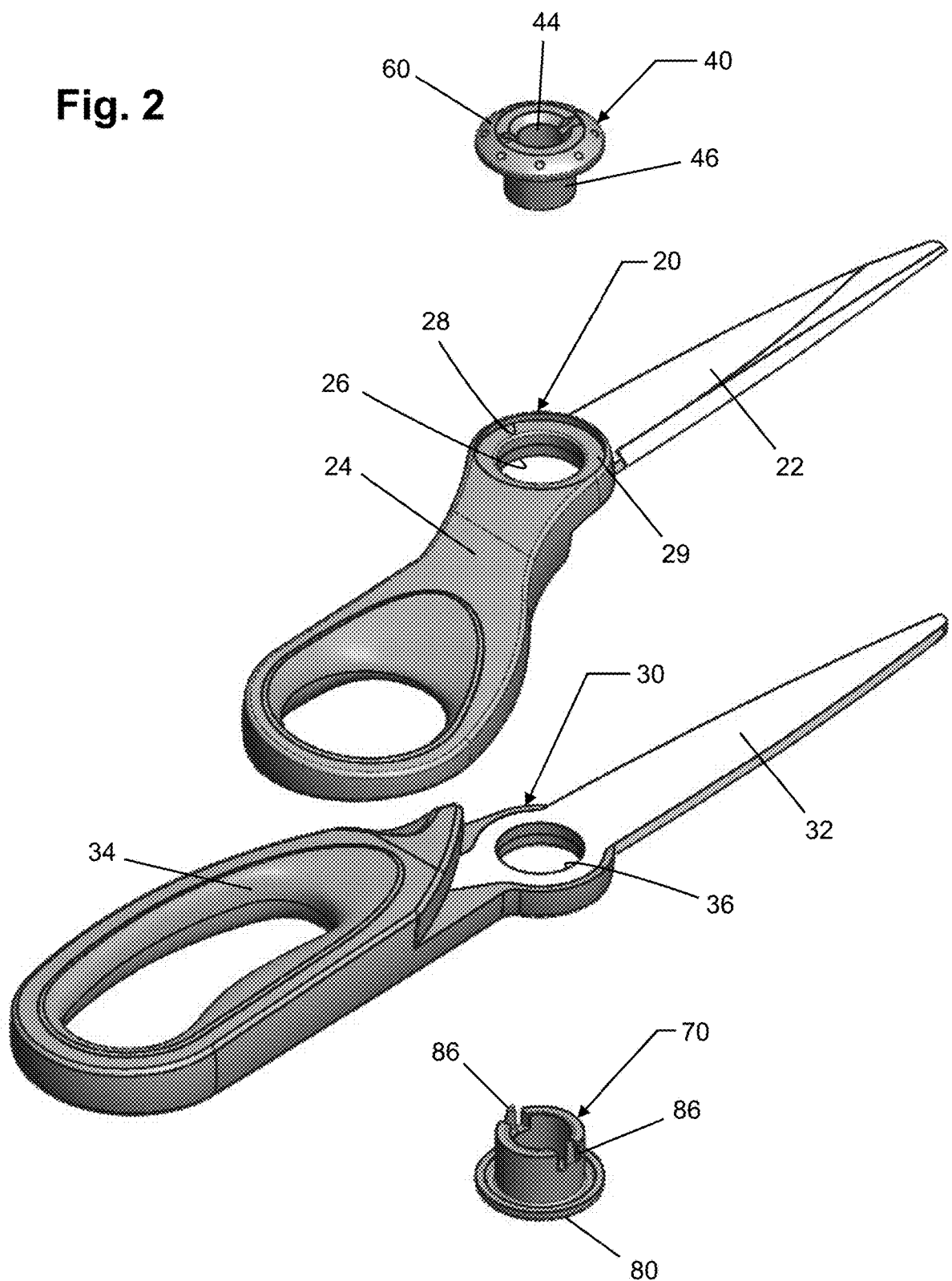
FIG. 2 is an exploded view of the scissors and pivot assembly of FIG. 1.

With reference to the drawings wherein like numerals represent like parts throughout the figures, a low friction pivot assembly generally designated by the numeral 10 is employed with a representative pair of scissors 12. Numerous other scissor embodiments and pivoted cutter components may be employed with the low friction pivot assembly 10 which has numerous applications.

The scissors 12 employ a lever-like thumb blade assembly 20 which comprises a metal blade 22 secured by a thumb loop subassembly 24 comprising an elongated finger loop (see FIGS. 2, 10-14). A central pivot opening 26 of uniform diameter is defined in the blade assembly 20. The reverse side of the thumb loop subassembly has an annular recess 28 partially defined by a planar annulus 29 which surrounds the pivot opening 26.

A lever-like finger loop subassembly 30 includes a metal blade 32 attached to a finger loop subassembly 34 which includes a finger opening (see FIGS. 2, 14-17). A central pivot opening 36 extends through the handle subassembly and the blade. An annular recess 38 partially defined by a planar annulus 39 surrounds the pivot opening 36.

The low friction pivot assembly 10 comprises a first male hub member 40 and a female hub member 70 which threadably and lockably engage and extend through the openings 26 and 36, as will be further described below. The designations of upper and lower and top and bottom and are arbitrary in describing each hub member. The noted positions are principally described herein consistent with the component positions of FIG. 2.

Figure 3:
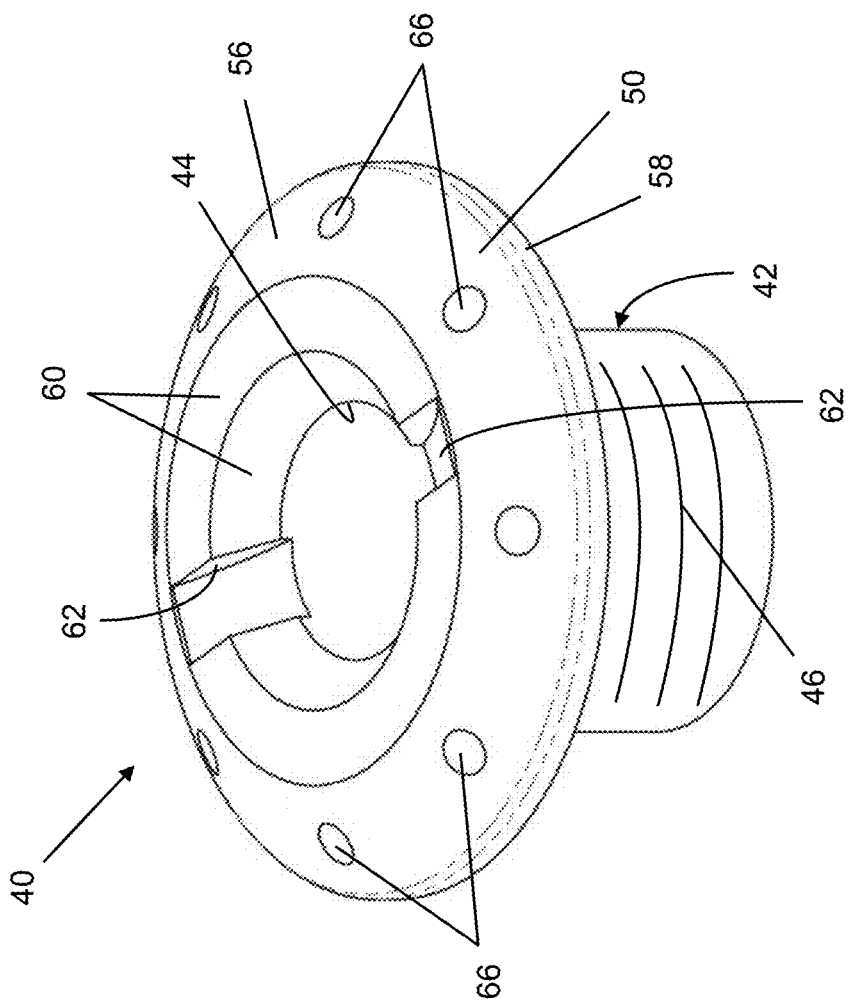
FIG. 3 is an enlarged perspective view of a hub member employed in the pivot assembly of FIG. 1.
Figure 4:
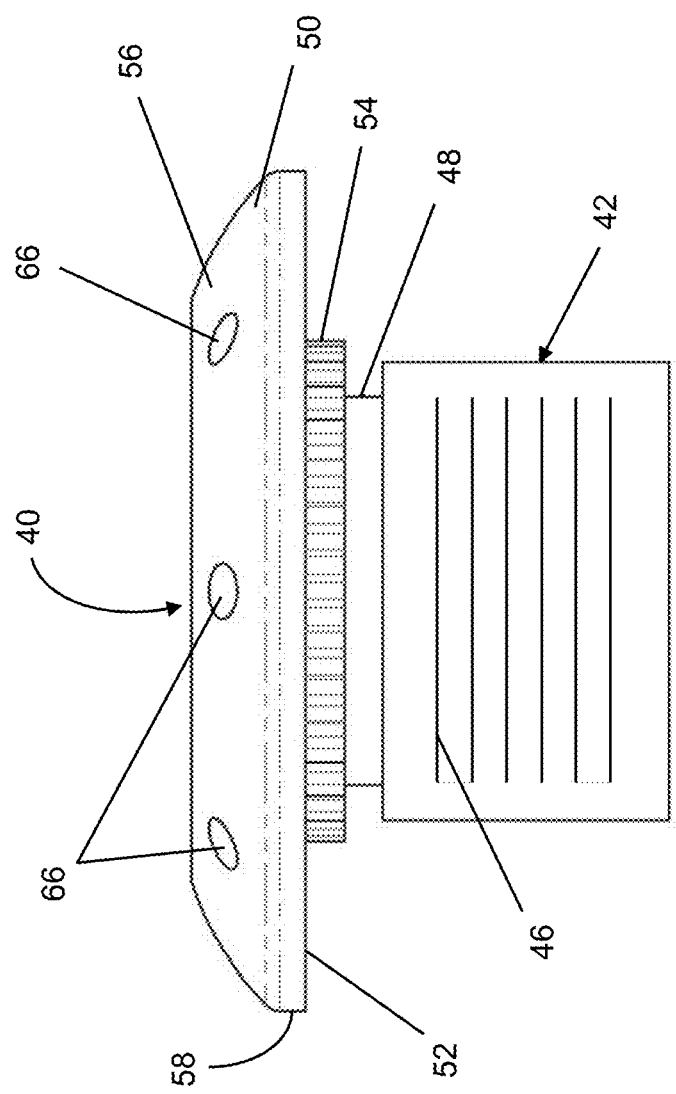
FIG. 4 is a side elevational view of the hub member of FIG. 3.
Figure 5:
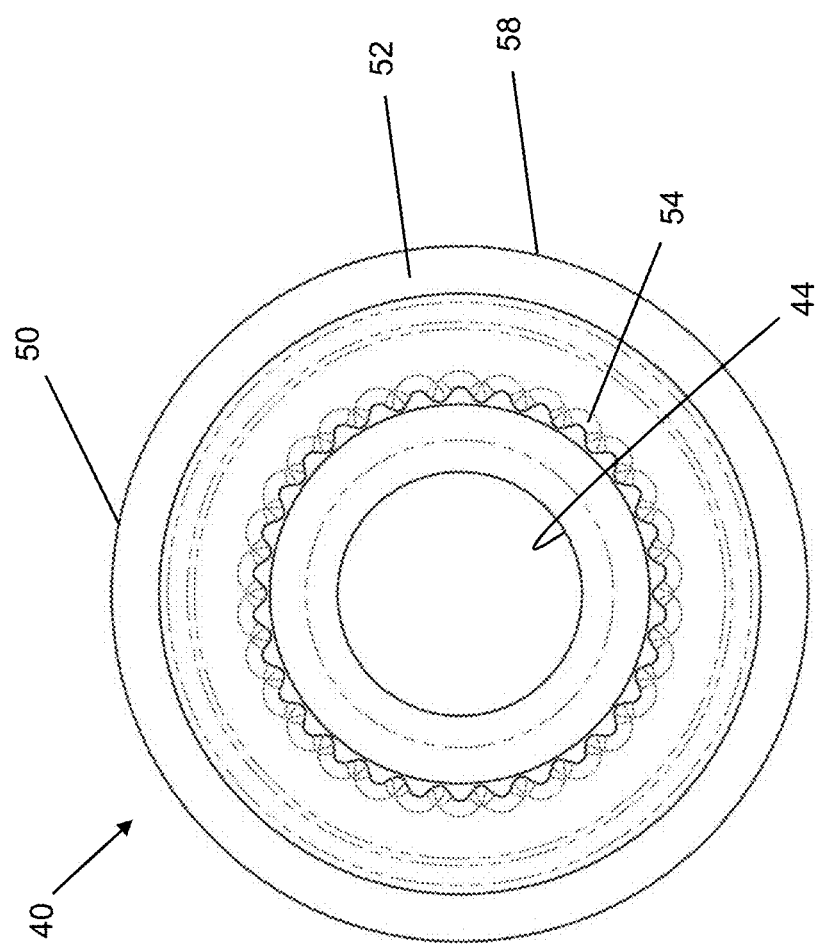
FIG. 5 is a bottom plan view, partly in phantom, of the hub member of FIG. 3.
Figure 6:
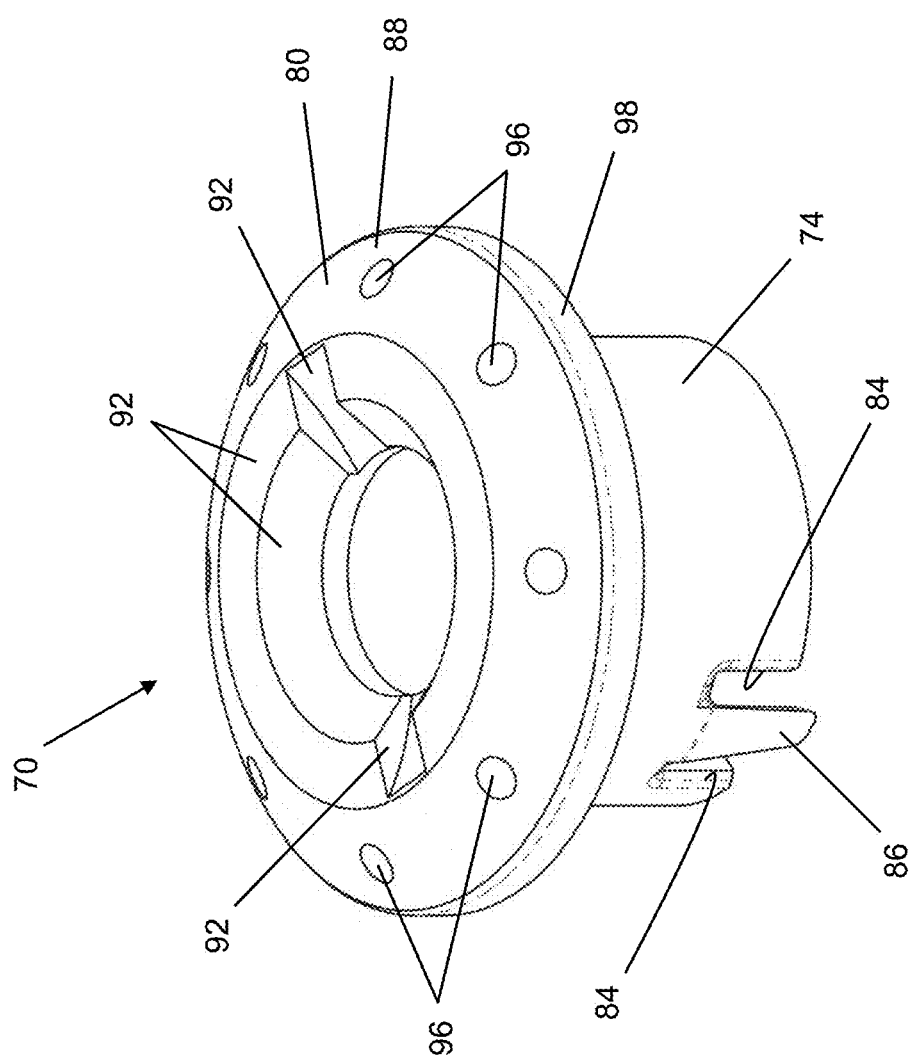
FIG. 6 is an enlarged perspective view of second hub member employed in the pivot assembly of FIG. 1.
Figure 7:
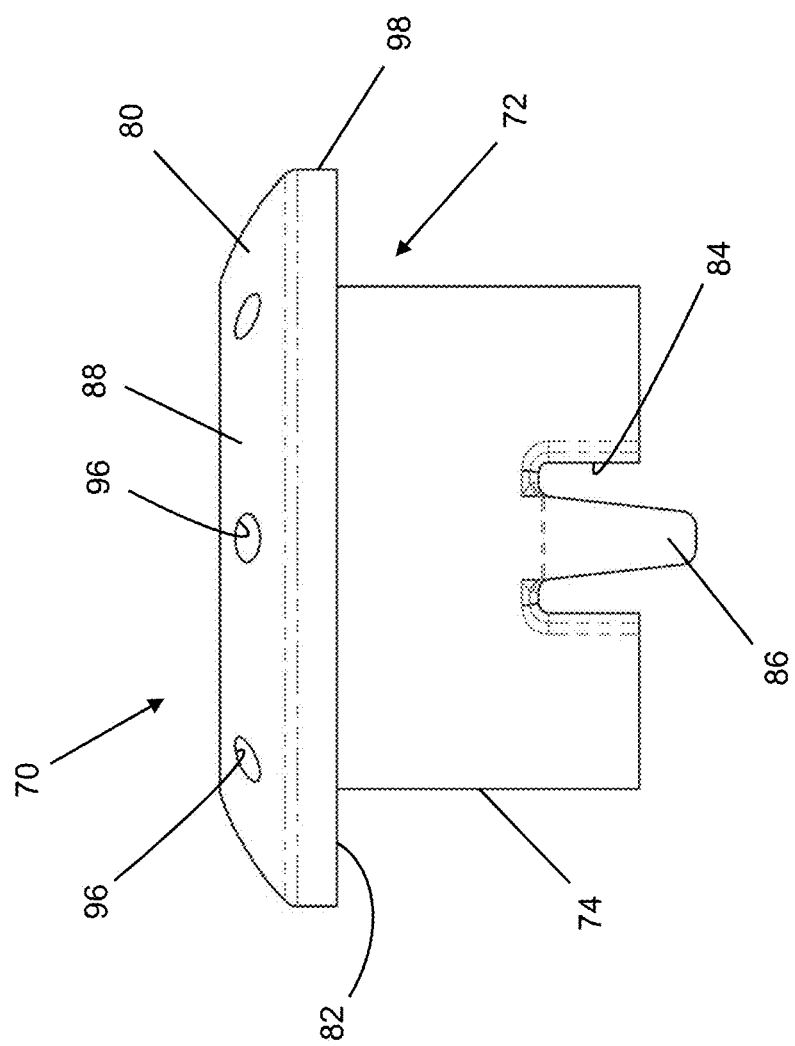
FIG. 7 is a side elevational view, partly in phantom, of the hub member of FIG. 6.

With additional reference to FIGS. 3-5, the male hub member 40 comprises a generally cylindrical sleeve 42 which defines a cylindrical throughbore 44 and has an exterior threaded surface 46. The upper portion of the sleeve forms a cylindrical thread relief 48 and integrally connects with a flange-like head 50. The underside of the head includes an annular planar smooth surface 52 which is generally commensurate with and receivable against the recess annulus 29. A circumferential serrated surface 54 adjacent the underside of the head is generally coaxial with the sleeve. Surface 54 preferably forms 24 equiangularly spaced serrations.

The upper portion of the head includes a tapered surface 56 which terminates in a peripheral rim 58 and an inwardly dual angled surface 60 which descends to a position adjacent the end of the throughbore 44. A pair of opposed oblique slots 62 are formed in the bi-level surface. Equiangularly spaced shallow dimples 66 are angularly arranged and defined in the upper surface.

With reference to FIGS. 6-9, the female hub member 70 includes an upper sleeve 72 with a cylindrical exterior surface 74 which has a diameter commensurate with the diameter of the pivot openings 26 and 36 of the thumb and finger subassemblies. The interior surface of the female hub member is tapped to form a thread 76 complementary with the thread 46 of the male member. The thread 76 generally extends to a lip 78 at the end of surface 76.

Figure 8:
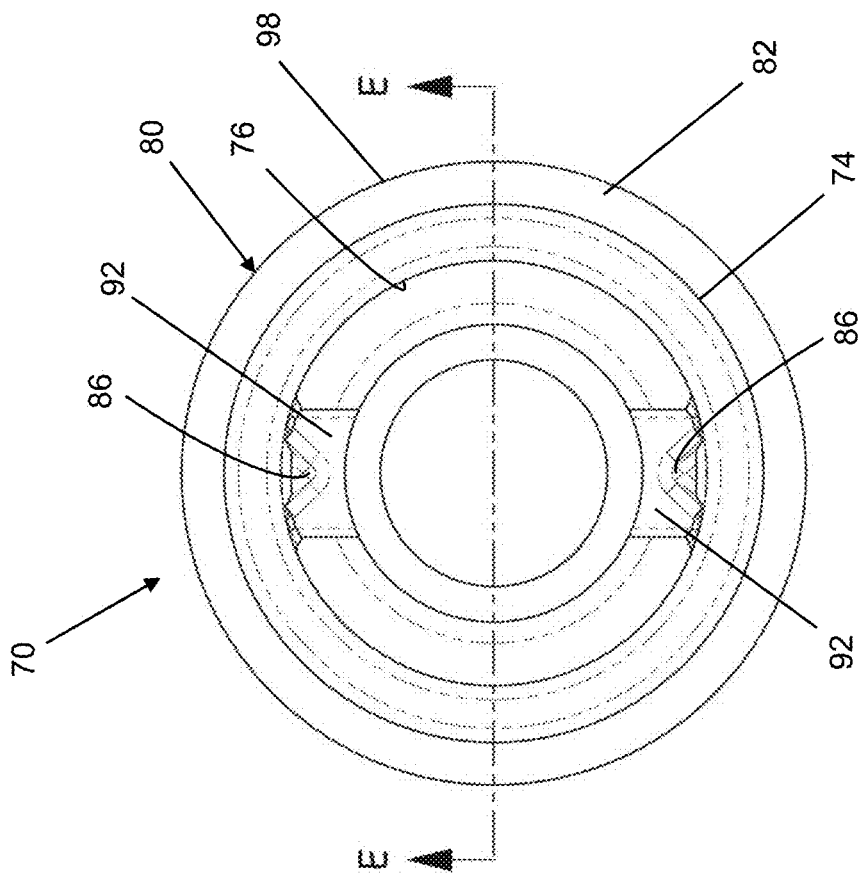
FIG. 8 is a bottom plan view, partly in phantom, of the hub member of FIG. 6.
Figure 9:
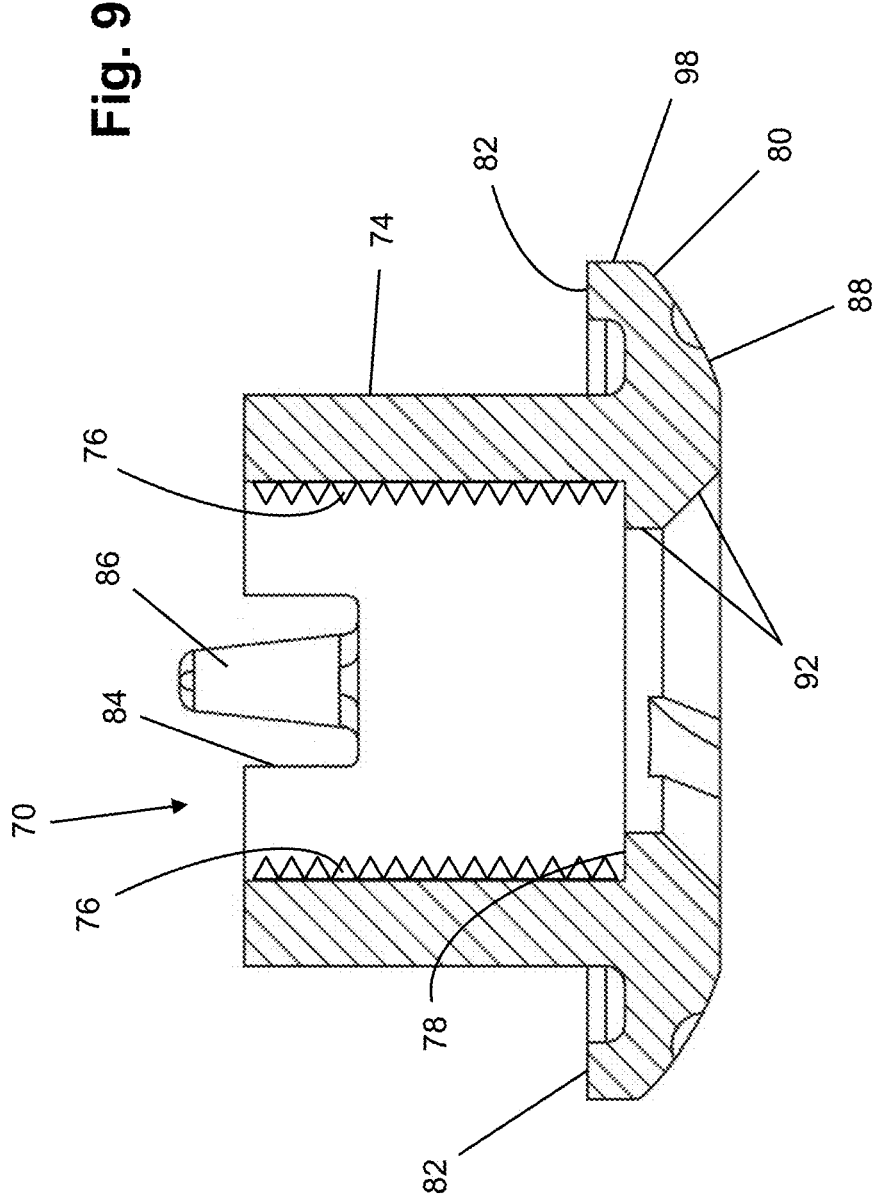
FIG. 9 is a side sectional view of the hub member of FIG. 7, taken along the line E-E thereof.
Figure 10:
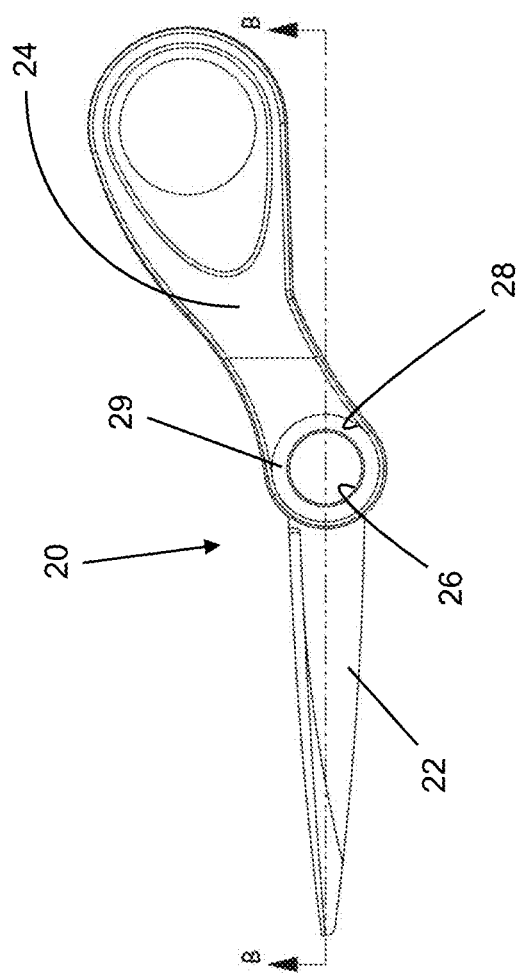
FIG. 10 is an annotated top view of a thumb loop subassembly for the scissors of FIG. 1.
Figure 11:
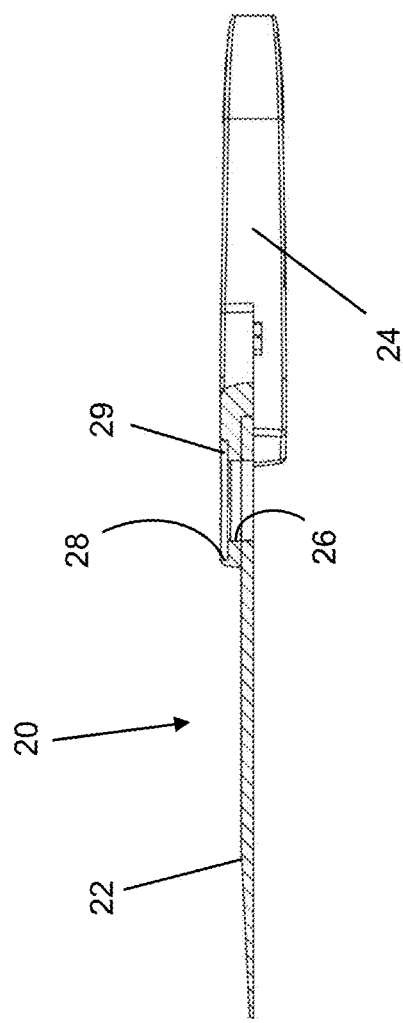
FIG. 11 is a sectional view of the thumb loop subassembly taken along the line B-B of FIG. 10.
Figure 16:
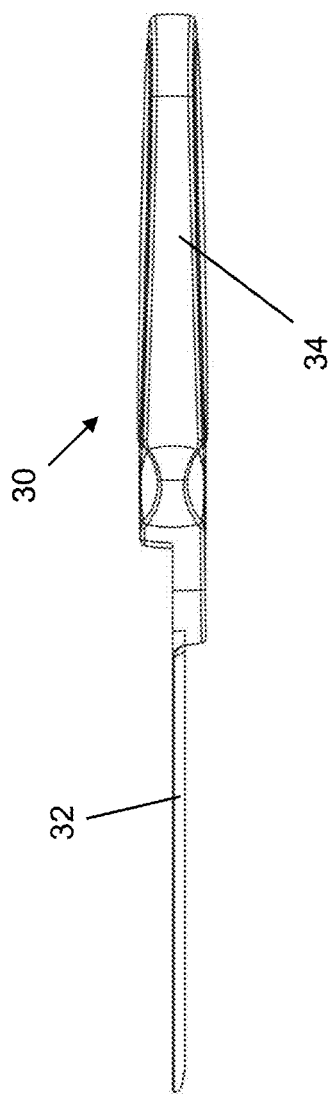
FIG. 16 is a side view of the finger loop subassembly of FIG. 15.
Figure 17:
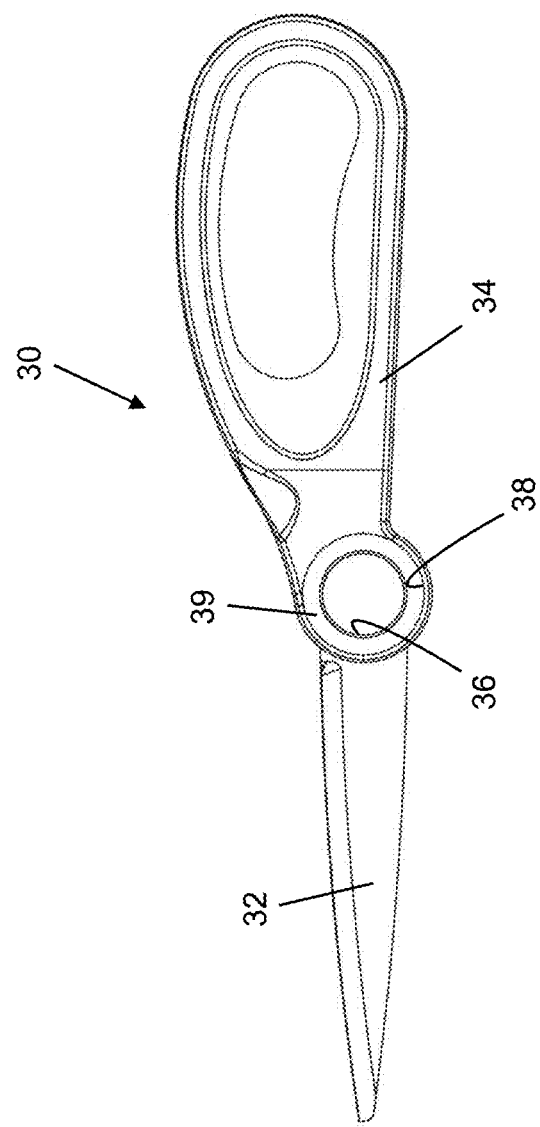
FIG. 17 is a bottom plan view of the finger loop subassembly of FIG. 14.
Figure 18:
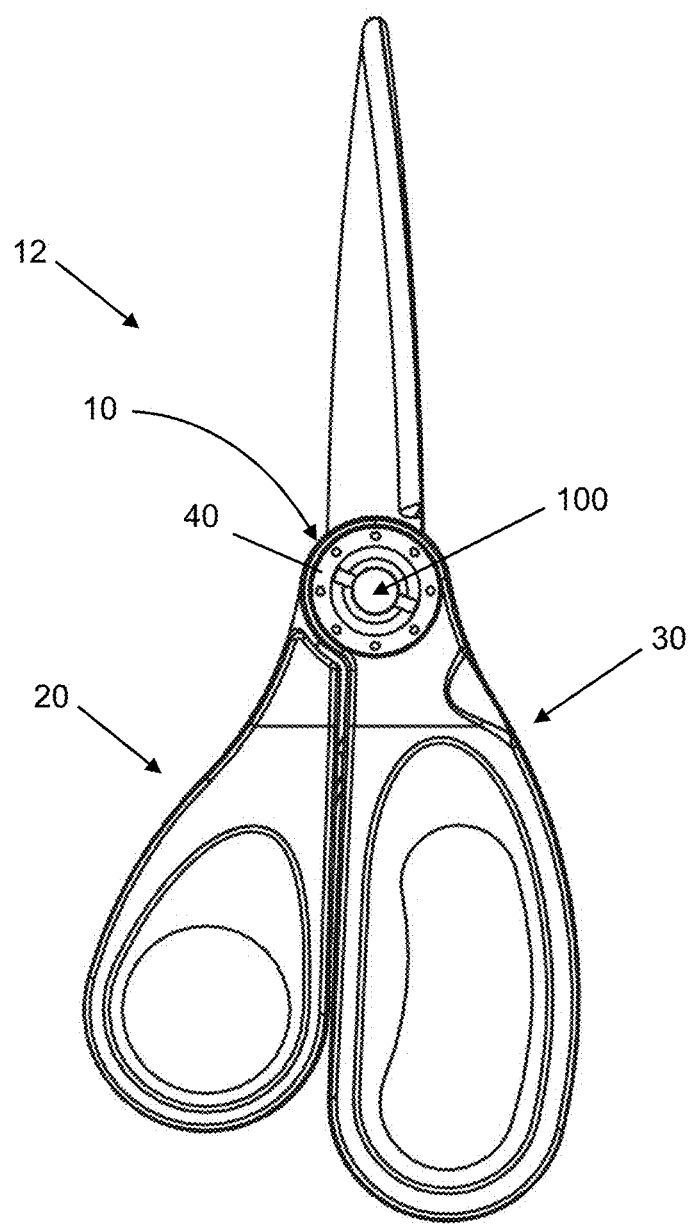
FIG. 18 is a top plan view of the scissors of FIG. 1 in a closed position.
Figure 19:
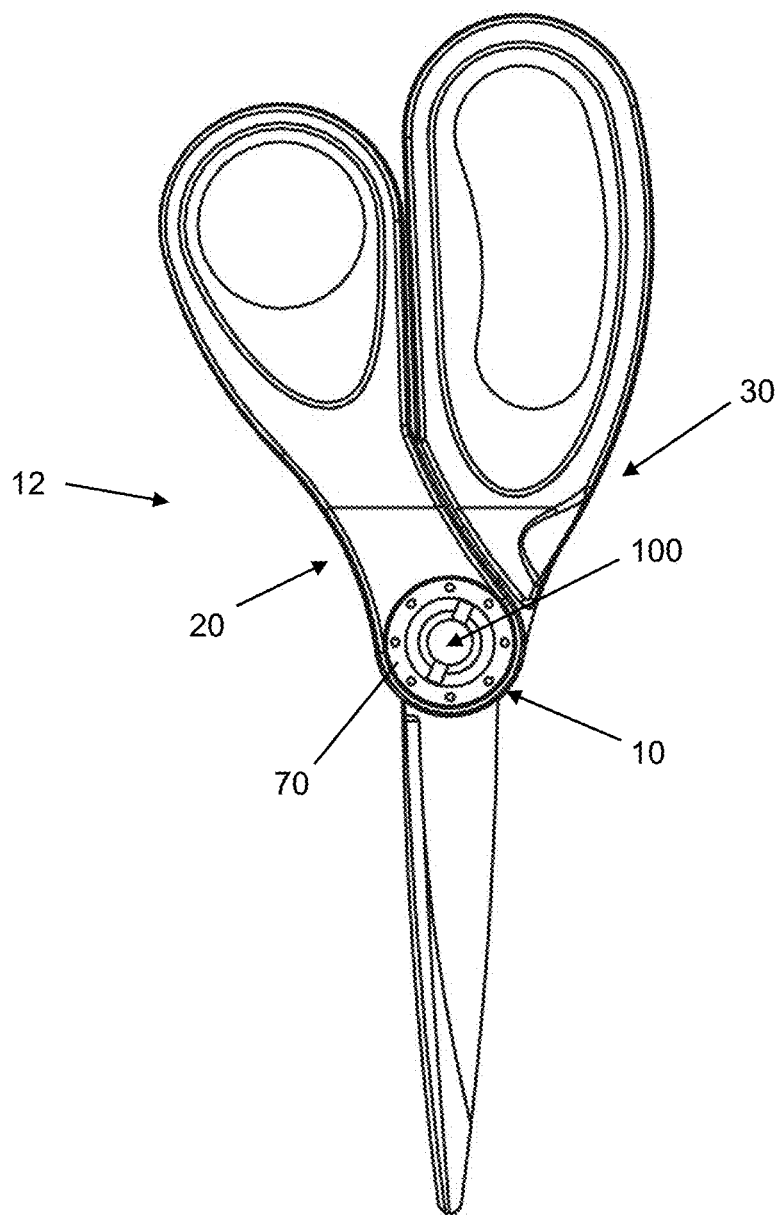
FIG. 19 is a bottom plan view of the scissors of FIG. 18.
Figure 20:
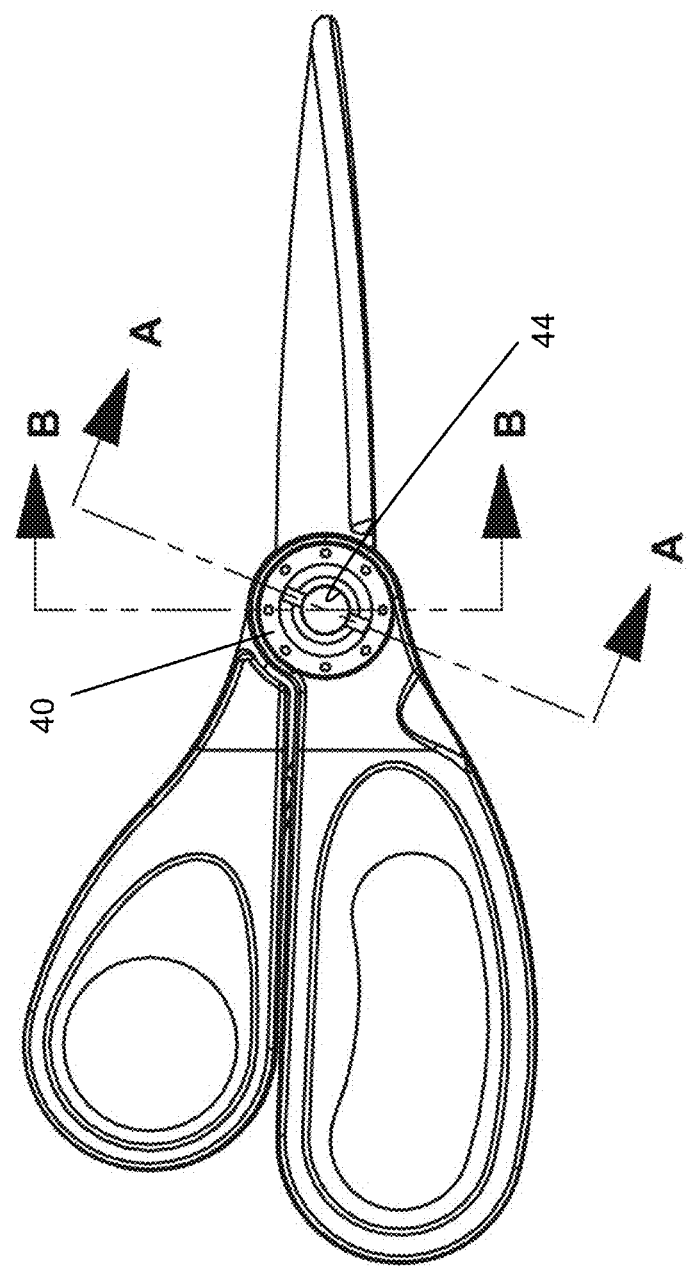
FIG. 20 is a top plan view of the scissors of FIG. 18 showing various section lines.
Figure 21:
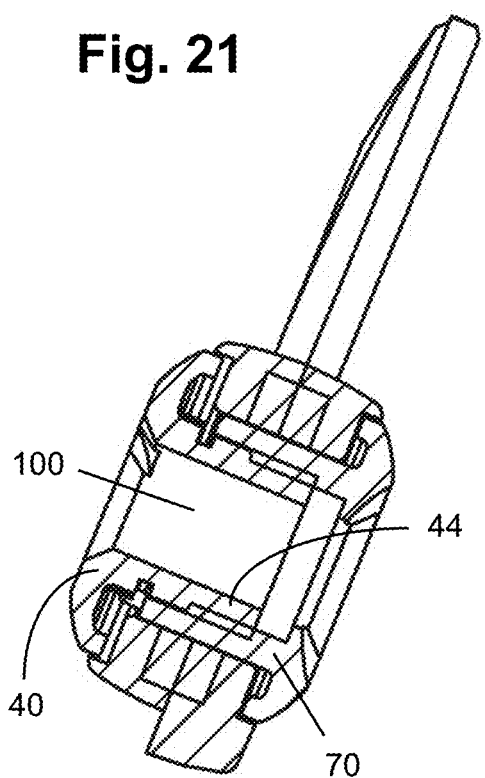
FIG. 21 is an enlarged sectional view taken along the line A-A of FIG. 20.
Figure 22:
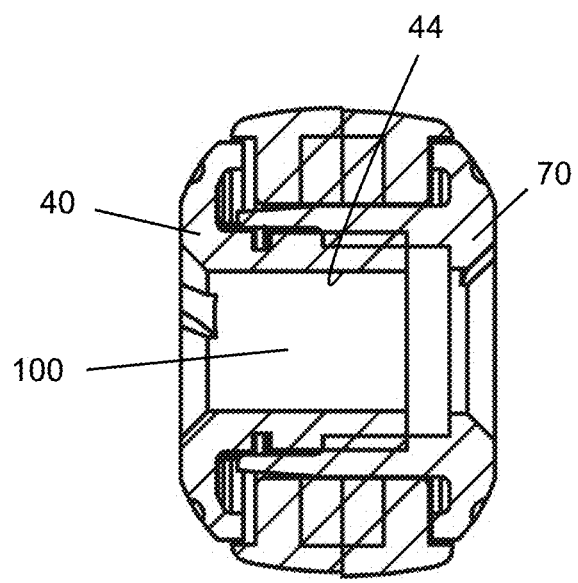
FIG. 22 is an enlarged sectional view taken along the line B-B of FIG. 20.

A lower head 80 of the female hub is substantially identical to head 50. Head 80 includes a flange-like portion which has a smooth top side surface 82 generally commensurate in shape and dimensions with the surface 39 of the recess 38 of the finger subassembly. The top of the sleeve includes opposed cutouts 84. An integral resilient ratchet pawl 86 projects into and beyond each cutout. Each ratchet pawl 86 is biasable against the serrated surface 54 to provide a locking-type ratchet arrangement. The pawls 86 have a generally radially inward V-shaped construction (FIG. 8).

The lower head 80 of the female member 70 includes a contoured surface 88 and a peripheral rim 98 which is substantially equal in shape and dimension to that for the male hub member. The bottom surface also includes a dual angled surface 90 which is interrupted by opposed slots 92. Equiangularly spaced shallow dimples 96 are defined in the surface 88.

The pivot assembly is assembled by inserting the female member 70 from the underside of the finger subassembly into opening 36. The thumb subassembly 20 is laid over the finger subassembly 30 and the openings 26 and 36 are aligned. The male hub member 40 is then threadably engaged to the female hub member 70 and, as the hubs engage, the ratchet pawls 86 engage detents of surface 54 to lock the engagement.

It will be appreciated that the diameter of the exterior sleeve surface 74 of the female member is substantially commensurate with the diameter of the pivot opening 36.

Exterior surface 74 is smooth and functions as the rotational or pivotal bearing surface for the pivoted thumb loop subassembly 20 and finger loop subassembly 30. The surface of the male hub member 40 engages annulus 29 of the thumb opening and surface 82 of the female hub member 70 engages annulus 39 to clamp the scissors together.

With reference to FIGS. 18-22, a throughbore 100 extends through the female and male hub members and is essentially defined by the central bore 44 of the male member.

The slots 62 and 92 are adapted to receive a coin or other tool on opposed sides of the male hub member and the female hub member, which can allow for tightening or loosening of the threaded and ratchet engagement as desired.

With reference to FIGS. 23-28, a second embodiment of a low friction pivot assembly is generally designated by the numeral 110 and is employed with a representative pair of scissors 112. The low friction pivot assembly may be employed in numerous lever-like pivotal cutting and clamping tools.

The scissors 112 employ a lever-like thumb blade assembly 120 which comprises a metal blade 122 secured by a thumb loop sub-assembly 124 comprising a thumb finger loop.

A central pivot opening 126 of uniform diameter is defined in the blade assembly 120. The thumb loop subassembly has a recess 128 partially defined by a serrated quasi-annulus 129 which surrounds the pivot opening 126.

A lever-like finger loop assembly 130 includes another blade 132 attached to a finger loop sub-assembly 134 that includes an elongated finger opening. A central pivot opening 136 extends through the handle, sub-assembly and the blade. A quasi-annular recess 138 partially defined by a plurality of angularly spaced recesses 139 surrounds the pivot opening 136.

The low friction pivot assembly 110 comprises a first male hub member 140 and a female hub member 170. Male hub member 140 and female hub member 170 threadably and lockably engage and extend through the openings 126 and 136. It will again be appreciated that the designations of upper and lower and top and bottom are arbitrary in describing each of the hub members. The noted positions are principally described herein and consistent with the component positions of FIG. 23.

Figure 23:
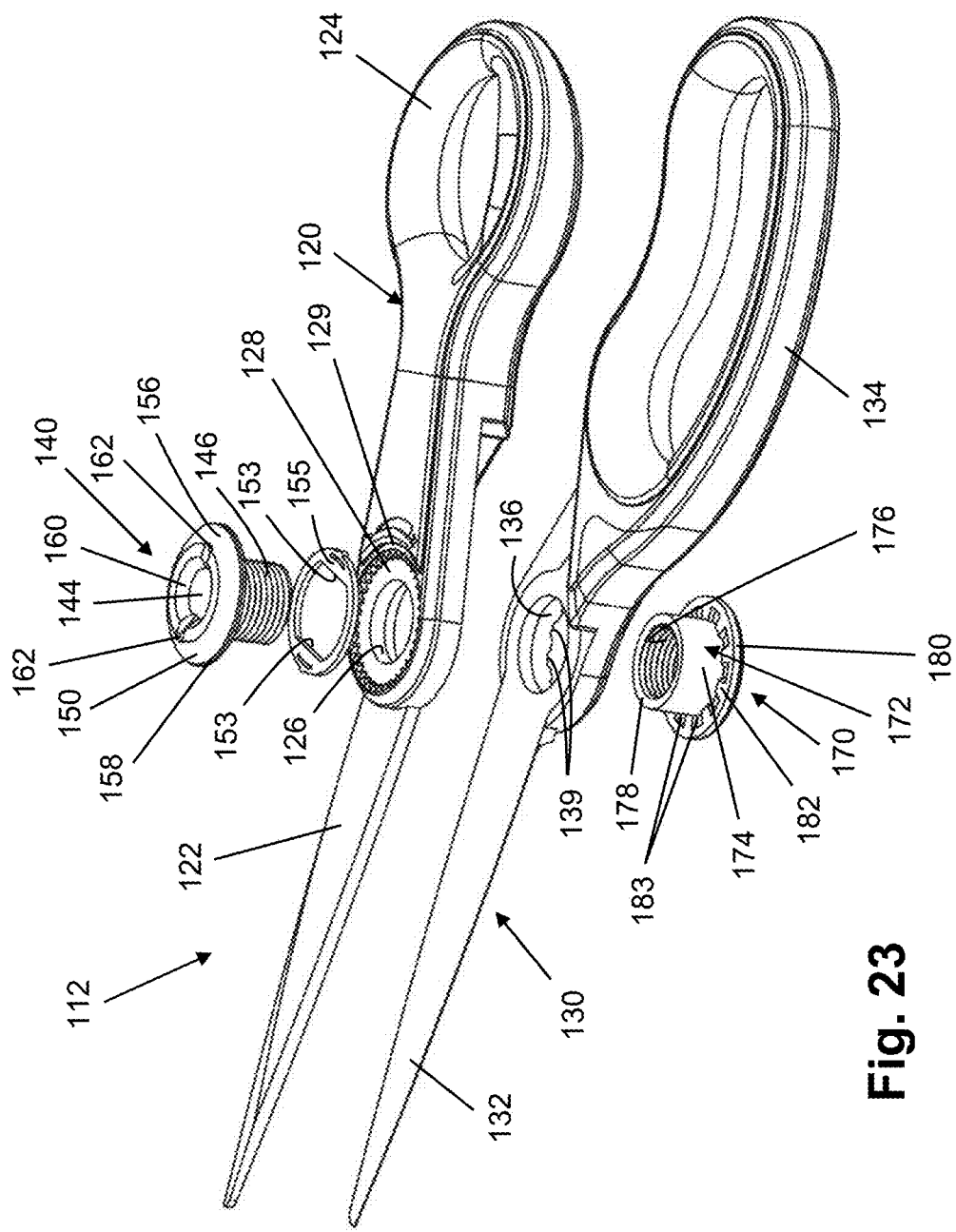
FIG. 23 is an exploded generally top perspective view of a pair of scissors which employs a second embodiment of a low friction pivot assembly.
Figure 24:
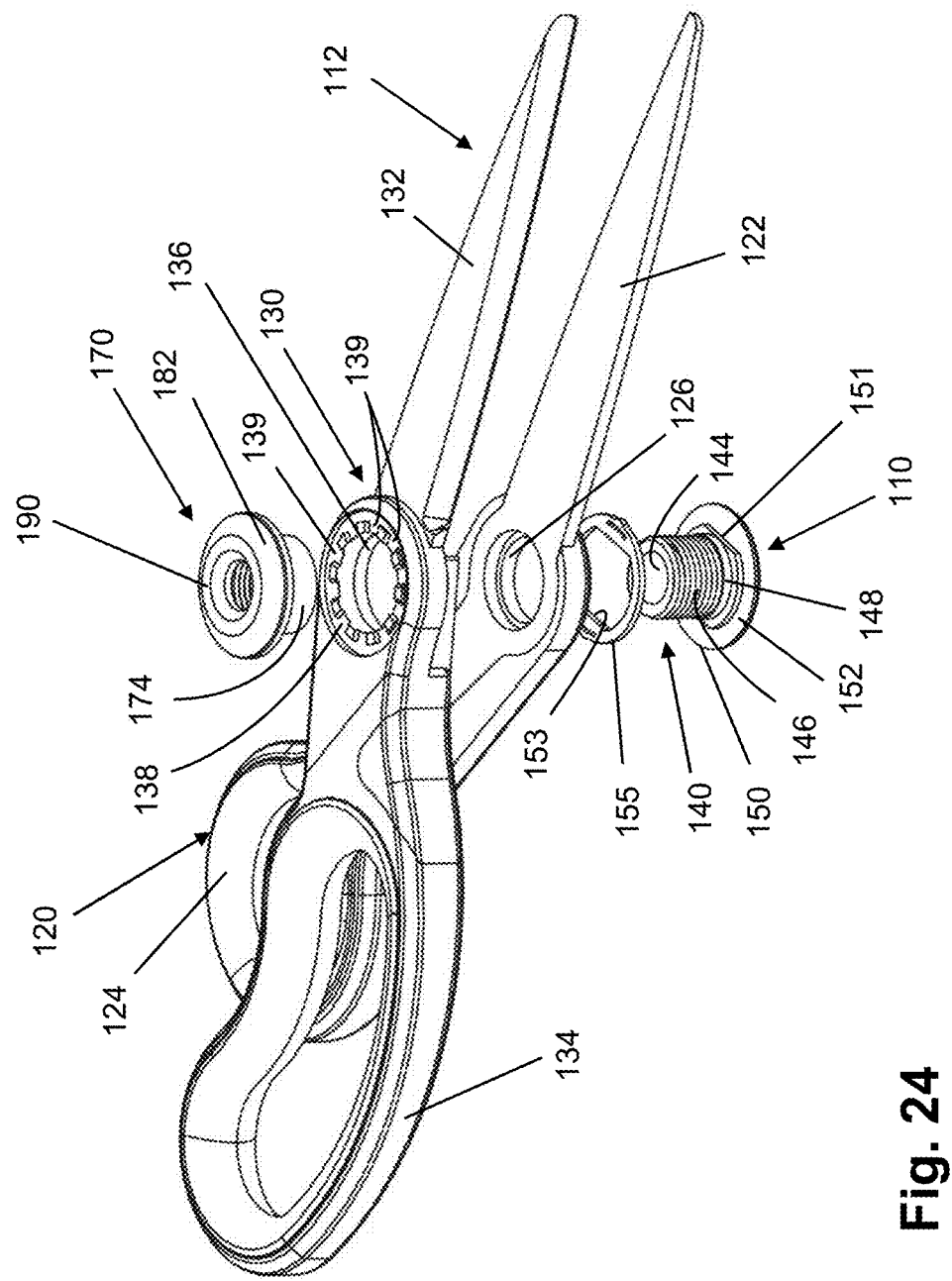
FIG. 24 is an exploded generally bottom perspective view of the scissors and low friction pivot assembly of FIG. 23.
Figure 28:
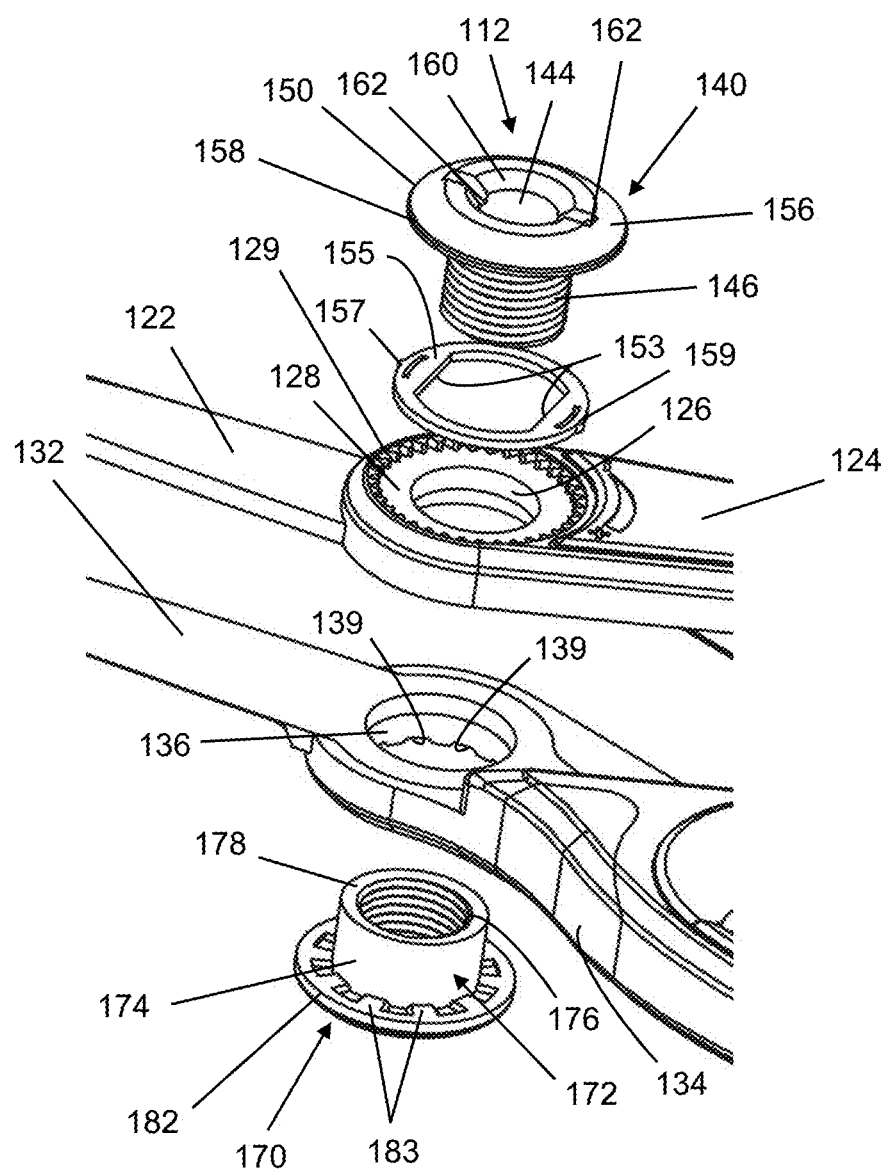
FIG. 28 is an enlarged fragmentary exploded view of the scissors and low friction pivot assembly of FIG. 23.

With additional reference to FIGS. 23, 24 and 28, a cylindrical sleeve of member 140 defining throughbore 144 and has an exterior thread surface 146. The upper portion of the sleeve forms a cylindrical thread relief 148 (FIG. 24) and integrally connects with a flange-like head 150. The underside of the head includes an annular planar surface 152. A platform protrudes from surface 152 and includes opposed flats 151.

The male hub member 140 receives a lock washer 155 which has an opening with a pair of opposed flats 153 which engage flats 151 to rotatably fix the washer with the hub member 140 has a pair of opposed integral truncated pawls 157 and 159. The equiangular serrations of surface 129 are engaged at radially opposed positions by the pawls 157 and 159 of the locking washer 155 to form a quasi-ratchet-like engagement.

The upper portion of the head includes a tapered surface 156 which terminates in a peripheral rim 158 and an inwardly dual angled surface 160 which descends to a position adjacent the end of the throughbore 144. A pair of opposed oblique slots 162 are formed in the bi-level surface. Equiangularly spaced dimples (not illustrated) optionally are angularly arranged and defined in the upper surface.

With reference to FIGS. 23 and 28, the female hub member 170 includes an upper sleeve 172 with a cylindrical exterior surface 174. Surface 174 has a diameter commensurate with the diameter of the pivot openings 126 and 136 of the thumb and finger sub-assemblies. The interior surface of the female hub member is tapped to form a thread 176 complementary with the thread 146 of the male member. The thread generally extends to a lip 178 at the end of surface 176.

A lower head 180 of the female hub substantially includes a flange-like portion which has a surface 182 of angularly spaced detents 183. The detents 183 are complementary with the recesses 139 of the finger loop assembly so that the female hub meshes with the finger loop assembly and is essentially rotatably fixed relative of the finger sub-assembly.

Figure 26:
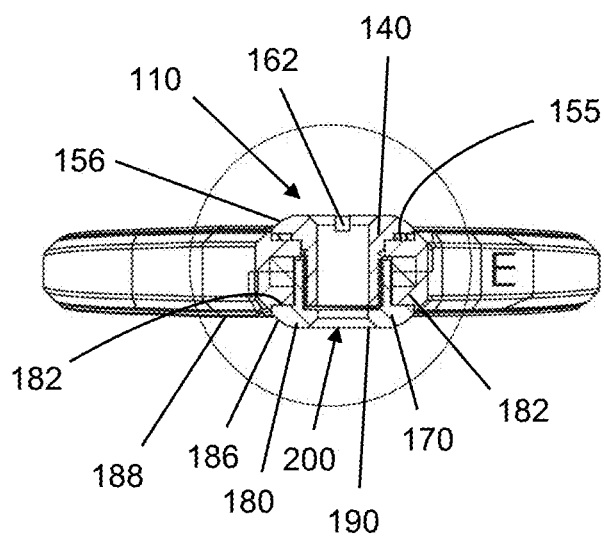
FIG. 26 is a sectional view of the scissors and low friction pivot assembly of FIG. 25 taken along the line D-D thereof.
Figure 27:
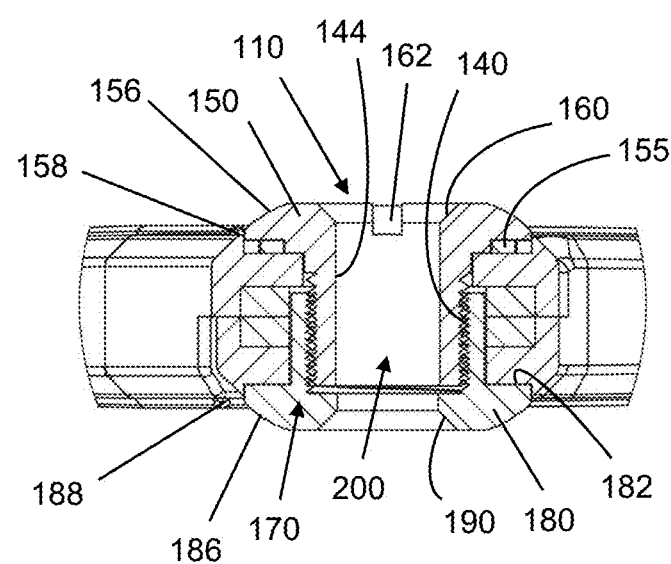
FIG. 27 is an enlarged sectional view of the circled portion of FIG. 26.

The lower head 180 of the female member 170 includes a contoured surface 186 and a peripheral rim 188 (FIGS. 26, 27). The contoured surface 186 is similar to the peripheral rim 158 which is substantially equal in shape and dimension of that for the male hub member. The bottom surface also includes a dual angled surface 190 which is traversed by optional opposed slots (not illustrated). Equiangularly spaced shallow dimples (not illustrated) are optionally defined in the surface 180.

The pivot assembly 110 is assembled by inserting the female member 170 from the underside of the finger subassembly into opening 136 while rotatably fixing the female member relative to the finger sub-assembly. The thumb sub-assembly 120 is laid over the finger sub-assembly 130 and the openings 126 and 136 are aligned. The male hub member 140 is then threadably engaged to the female hub member 170. As the hubs engage, the shallow ratchet pawls 157 and 159 engage the serrations of the surface 129 to lock the engagement in a quasi-ratchet engagement.

It will be appreciated that the diameter of the exterior sleeve surface 174 of the female member is substantially commensurate with the diameter of the pivot opening 136. Exterior surface 174 is smooth and functions as the rotational pivotal bearing for the pivoted thumb loop sub-assembly 120 and finger loop sub-assembly 130. The surface of the male hub member 140 engages annulus 129 of the thumb opening and surface 182 of the female hub member engages surface 139 to clamp the scissors together.

Figure 25:
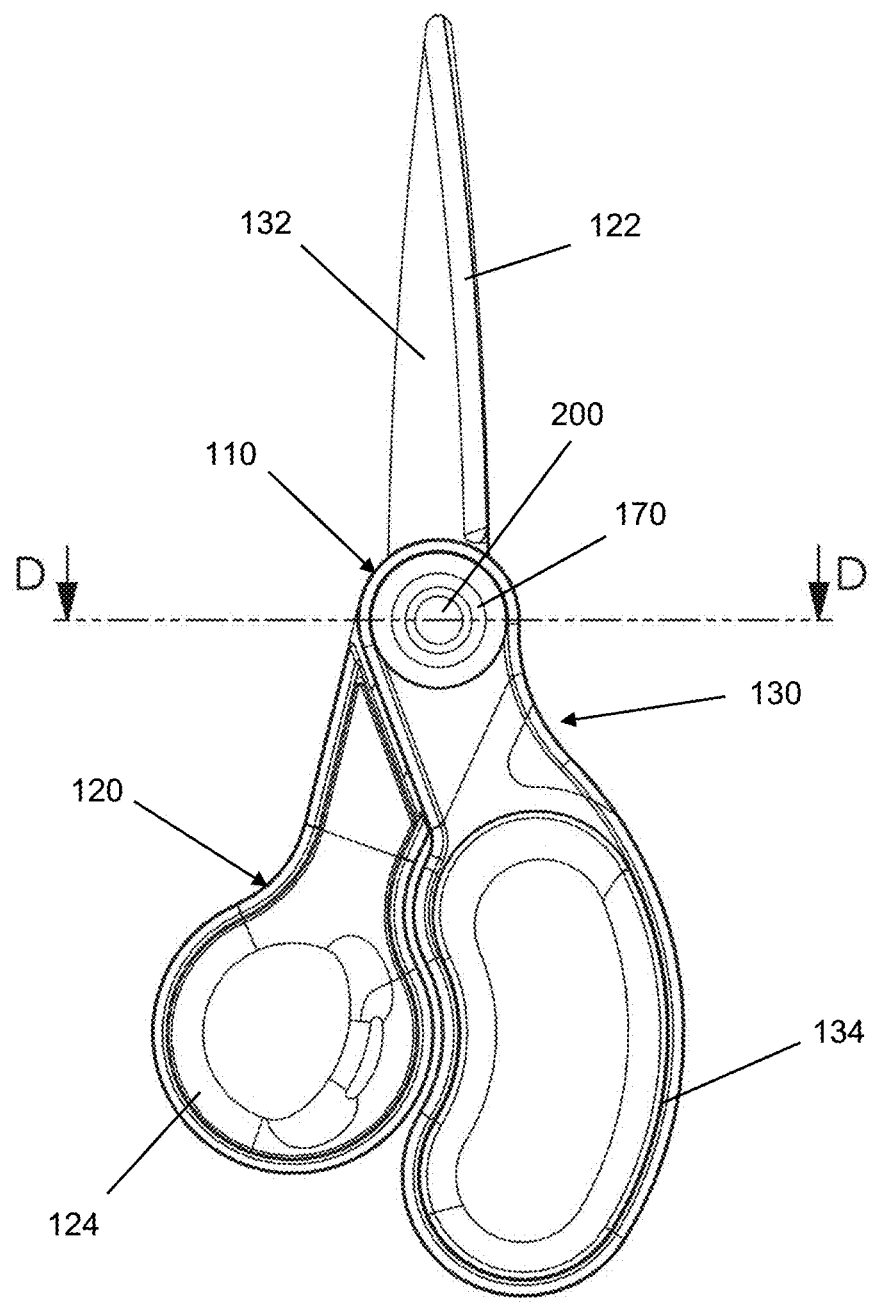
FIG. 25 is a bottom plan view of the scissors and low friction pivot assembly of FIG. 23.

It will be appreciated, with reference to FIGS. 25-27, that a throughbore 200 extends through the male and female hub members and is essentially defined by the central bore 144 of the male member.

The slots 162 are adapted to receive a coin or other tool which can allow for tightening or loosening of the threaded and ratchet-type engagement as desired.

With reference to FIGS. 29-33, a third embodiment of a low friction pivot assembly is generally designated by the numeral 210 and is employed with a pair of representative scissors 212. The low friction pivot assembly 210 may also be employed in numerous lever-like pivotal cutting and clamping tools.

The scissors 212 employ a lever-like thumb blade assembly 220 which comprises a metal blade 222 secured to a thumb loop sub-assembly 224. A central pivot opening 226 is defined in the blade assembly 220. The opening has a pair of opposed axial flats 227. The thumb loop subassembly also has a recess 228 partially defined by an annulus 229 which surrounds the pivot opening 226.

A lever-like finger loop assembly 230 includes another blade 232 attached to a finger loop subassembly 234 that includes an elongated finger opening. A central pivot opening 236 extends through the handle subassembly and the blade and has a substantially uniform diameter. A quasi-annular recess 238 is partially defined by a plurality of angularly spaced detents or serrations 239 which surrounds the pivot opening 236.

The low friction pivot assembly 210 comprises a first male hub member 240 and a female hub member 270. Male hub member 240 and female hub member 270 threadably and lockably engage and extend through the openings 226 and 236. The designations of upper and lower and top and bottom are arbitrary in describing each of the hub members. The noted positions are principally described herein consistent with the corresponding positions in FIG. 30.

The female hub member 270 includes an upper sleeve 272. The interior surface of the female hub member is tapped to form a thread 276. The exterior surface of the female hub at an upper member has opposed flats 279 which are complementary with the flats 227 of the opening so that the female hub member is rotatably fixed relative to the thumb blade assembly 220 and metal blade 222. A lower head 280 of the female hub member assembly includes a flange-like portion which engages and is received in the annular opening 228 and approaches or engages the surface 229. Alternative opening/sleeve interfaces may be employed to rotatably fix the components.

The male hub member 240 receives a lock washer 255 (FIG. 30A) which has at its periphery a pair of opposed lever-like pawls 257 and 259. The pawls are biased slightly radially. The pawls 257 and 259 form a ratchet-like engagement with the serrations 239 which surrounds the pivot opening. The male hub member 240 includes an upper flange-like head 250 with a quasi-square underside 252. The lock washer 255 has a complementary quasi-square opening 258 to rotatably fix the washer with the male member 240. Alternative shoulder/opening interfaces may be employed to rotatably fix the components.

The male member 240 includes a sleeve 242 which integrally extends from the head and forms a thread 246 complementary to the thread 276 of the female assembly. The male member and sleeve have a central throughbore 244. The upper head includes diametrical slots 292 which slightly taper toward the throughbore 244 and provide a detent for a coin or similar object to rotate and threadably engage the male member with the female member.

The pivot assembly 210 may be assembled by inserting the female hub member 270 from the underside of the thumb blade assembly 220 into the opening 226 while rotatably fixing the female member relative to the thumb blade assembly. The finger blade assembly 230 is laid over the thumb blade assembly so that the openings 226 and 236 are aligned. The male hub member 240 is then threadably engaged to the female hub member 270. As the hub members engage, detent-like recesses 239, the shallow ratchet pawls 257 and 259 engage to lock the engagement in a quasi-ratchet engagement.

The upper exterior sleeve surface of the female member functions as a rotational pivot bearing for the pivoted thumb loop assembly 220 and finger loop assembly 230. The surface 262 of the male hub member 240 engages the annulus 229 of the finger opening and surface 282 of the female hub member engages surface 239 to clamp the scissors together. A throughbore 300 extends through the male and female hub members and is essentially defined by the central bore of the male and female members.

While preferred embodiments of the foregoing have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

The invention claimed is:

1. A cutting device comprising:
 a first lever subassembly having a first cutting portion and defining a first non-circular opening and a first surface surrounding said first opening and defining a coaxial recessed surface and a coaxial serrated surface;
 a second lever subassembly having a second cutting portion and defining a second circular opening and a second surface surrounding said second opening;
 a first hub member comprising:
  a sleeve defining a cylindrical bore and having an exterior threaded surface;
  a head integrally extending at a top of said sleeve and having an upper surface terminating in a peripheral rim and having an inward surface adjacent said bore, and interrupted by a pair of opposed slots;
 a lock member received on said first hub member in rotatably fixed relationship and comprising at least one radially projecting pawl;
 a second hub member comprising:
  a sleeve having a non-circular exterior surface which engages said first subassembly in rotatably fixed relationship and a diameter substantially equal to said second opening diameter and defining an interior threaded surface;
  a head integrally extending at a bottom of said sleeve and defining an annular shoulder projecting radially from said sleeve and having a lower surface terminating in a peripheral rim and having an inward surface adjacent said bore,
 wherein said second hub member threadably receives said first hub member and said at least one radially projecting pawl engages said serrated surface to secure said first subassembly to said second subassembly, so that and said first and said second subassemblies are relatively pivotal, and a central throughbore traverses through said first and second hub members.

2. The cutting device of claim 1 wherein said first hub member further has a generally polygonally shaped shoulder at the underside of said head and said lock member defines a central opening which is configured so that said shoulder is received in said opening to rotatably fix said lock member with said first hub member.

3. The cutting device of claim 1 wherein said lock member comprises two generally diametrically opposed radially projecting pawls.

4. The cutting device of claim 1 wherein said sleeve of said second hub member has at least one flat and said first opening of said first lever subassembly has at least one flat wherein each said sleeve flat engages a flat of said first opening to rotatably fix said second hub member to said first sub-assembly.

5. The cutting device of claim 4 wherein said first opening and said second hub member sleeve have two flats.

6. The cutting device of claim 1 wherein said at least one radially projecting pawl has a V-shaped section.

7. The cutting device of claim 1 wherein said throughbore is partially defined by said cylindrical bore of said first hub member.

8. The cutting device of claim 1 wherein said exterior surface of said second hub member is adjacent the second subassembly second circular opening and functions as a rotational bearing.

9. The cutting device of claim 1 wherein said slots are oriented obliquely relative to said head of said first hub member.

10. A low friction connection assembly for pivotally connecting a pair of lever cutting members comprising:
- a first lever cutting member defining a first non-circular opening and having a serrated surface coaxial with said first non-circular opening;
- a second lever cutting member defining a second circular opening and having a second surface surrounding said second circular opening;
- a first hub member comprising:
  - a sleeve defining a cylindrical bore and having an exterior threaded surface;
  - a head integrally extending at a top of said sleeve and having an upper surface terminating in a peripheral rim and extending to said cylindrical bore;
- a lock member rotatably fixed with said first hub member and having a plurality of projections;
- a second hub member comprising:
  - a sleeve having a rounded exterior surface with at least one flat portion and defining an interior threaded surface;
  - a head integrally extending at a bottom of said sleeve and defining an annular shoulder projecting radially from said sleeve and having a lower surface terminating in a peripheral rim;
- wherein said second hub member threadably receives said first hub member so that said cylindrical bore defines a portion of a central throughbore which traverses through said first and second hub members, said projections engage said serrated surface and said first and second lever cutting members are connected and are relatively pivotal.

11. The connection assembly of claim 10 wherein there are two opposed pawls, each having a V-shaped section.

12. The connection assembly of claim 10 wherein at least one of said heads defines a pair of opposed slots.

13. The connection assembly of claim 10 wherein said upper surface of each of said hubs extends inwardly toward said throughbore.

14. A cutting device comprising:
- a first lever subassembly having a first cutting portion and defining a first non-circular opening and a first surface surrounding said first opening and having a coaxial recessed surface and a coaxial serrated surface;
- a second lever subassembly having a second cutting portion and defining a second circular opening
- a first hub member comprising:
  - a sleeve defining a cylindrical bore and having an exterior threaded surface;
  - a head integrally extending at a top of said sleeve and having an upper surface terminating in a peripheral rim;
- a lock member received on said first hub member in rotatably fixed relationship and comprising two radially projecting pawls;
- a second hub member comprising:
  - a sleeve having a non-circular exterior surface which engages said first subassembly in rotatably fixed relationship and a diameter substantially equal to said second opening diameter and defining an interior threaded surface;
  - a head integrally extending at a bottom of said sleeve and defining an annular shoulder projecting radially from said sleeve and having a lower surface terminating in a peripheral rim,
- wherein said second hub member threadably receives said first hub member and said pawls engage said serrated surface to secure said first subassembly to said second subassembly, so that said first and said second lever subassemblies are relatively pivotal, and a central throughbore traverses through said first and second lever subassemblies and said first and second hub members.

15. The cutting device of claim 14 wherein said first hub member further has a generally polygonally shaped shoulder at the underside of said head and said lock member defines a central opening which is configured so that said shoulder is received in said opening to rotatably fix said lock member with said first hub member.

16. The cutting device of claim 14 wherein said lock member comprises two generally diametrically opposed radially projecting pawls.

17. The cutting device of claim 14 wherein said sleeve of said second hub member has at least one flat and said first opening of said first lever subassembly has at least one flat wherein each said sleeve flat engages a flat of said first opening to rotatably fix said second hub member to said first sub-assembly.

18. The cutting device of claim 17 wherein said first opening and said second hub member sleeve have two flats.

19. The cutting device of claim 14 wherein said pawls have a V-shaped section.

* * * * *